US009419867B2

(12) United States Patent
Okholm et al.

(10) Patent No.: US 9,419,867 B2
(45) Date of Patent: *Aug. 16, 2016

(54) DATA AND CONTROL PLANE ARCHITECTURE FOR NETWORK APPLICATION TRAFFIC MANAGEMENT DEVICE

(75) Inventors: Jon Eric Okholm, Monte Sereno, CA (US); Guy Riddle, Los Gatos, CA (US)

(73) Assignee: Blue Coat Systems, Inc., Sunnyvale, CA (US)

(*) Notice: Subject to any disclaimer, the term of this patent is extended or adjusted under 35 U.S.C. 154(b) by 1128 days.

This patent is subject to a terminal disclaimer.

(21) Appl. No.: 11/694,703

(22) Filed: Mar. 30, 2007

(65) Prior Publication Data

US 2008/0239956 A1  Oct. 2, 2008

(51) Int. Cl.
*H04L 12/26* (2006.01)
*H04L 12/801* (2013.01)
*H04L 12/813* (2013.01)
*H04L 12/851* (2013.01)
*H04L 12/24* (2006.01)

(52) U.S. Cl.
CPC .............. *H04L 43/02* (2013.01); *H04L 47/10* (2013.01); *H04L 47/20* (2013.01); *H04L 47/2441* (2013.01); *H04L 41/0213* (2013.01)

(58) Field of Classification Search
USPC ...................................................... 726/22–26
See application file for complete search history.

(56) References Cited

U.S. PATENT DOCUMENTS

| | | | |
|---|---|---|---|
| 5,877,812 A * | 3/1999 | Krause et al. | 375/240.25 |
| 6,182,146 B1 * | 1/2001 | Graham-Cumming, Jr. | 709/238 |
| 6,493,800 B1 | 12/2002 | Blumrich | |
| 6,621,792 B1 | 9/2003 | Petty | 370/230 |
| 6,639,910 B1 | 10/2003 | Provencher et al. | 370/351 |
| 6,711,689 B2 * | 3/2004 | Lumme et al. | 726/22 |
| 7,028,098 B2 | 4/2006 | Mate et al. | 709/238 |
| 7,447,872 B2 | 11/2008 | Schroter et al. | |
| 7,643,496 B1 * | 1/2010 | Jamieson et al. | 370/400 |
| 7,849,506 B1 * | 12/2010 | Dansey et al. | 726/22 |
| 2001/0055276 A1 * | 12/2001 | Rogers et al. | 370/232 |
| 2002/0141425 A1 | 10/2002 | Merani | |

(Continued)

FOREIGN PATENT DOCUMENTS

KR 10-2001-0085057 9/2001
WO WO 00/60590 10/2000

OTHER PUBLICATIONS

Lee et al., "NpBench: A Benchmark Suite for Control Plane and Data Plane Applications for Network Processors," Proceedings of the 21st International Conference on Computer Design, IEEE 2003, 8 pages.

(Continued)

*Primary Examiner* — Benjamin Lamont
(74) *Attorney, Agent, or Firm* — Baker Botts L.L.P.

(57) ABSTRACT

A data and control plane architecture for network devices. An example system architecture includes a network processing unit implementing one or more data plane operations, and a network device operably coupled to the network processing unit that implements a control plane. In a particular implementation, the network processing unit is configured to process network traffic according to a data plane configuration, and sample selected packets to the network device. The network device processes the sampled packets and adjusts the data plane configuration responsive to the sampled packets.

29 Claims, 7 Drawing Sheets

(56) References Cited

U.S. PATENT DOCUMENTS

| | | | |
|---|---|---|---|
| 2002/0143939 A1 | 10/2002 | Riddle et al. | |
| 2004/0131079 A1* | 7/2004 | Hegde et al. | 370/466 |
| 2004/0218561 A1* | 11/2004 | Obuchi et al. | 370/328 |
| 2006/0056406 A1 | 3/2006 | Bouchard et al. | |
| 2006/0059286 A1 | 3/2006 | Bertone et al. | |
| 2006/0059316 A1 | 3/2006 | Asher et al. | |
| 2006/0095741 A1 | 5/2006 | Asher et al. | |
| 2006/0230167 A1* | 10/2006 | Watanabe et al. | 709/230 |
| 2007/0121499 A1 | 5/2007 | Pal | |
| 2007/0160073 A1* | 7/2007 | Toumura | H04L 43/028 370/419 |
| 2007/0214267 A1* | 9/2007 | Ogura et al. | 709/226 |
| 2008/0316922 A1 | 12/2008 | Riddle et al. | |
| 2009/0003204 A1 | 1/2009 | Okholm et al. | |
| 2009/0083517 A1 | 3/2009 | Riddle | |
| 2009/0161547 A1 | 6/2009 | Riddle | |

OTHER PUBLICATIONS

Bros et al., "FFPF: Fairly Fast Packet Filters," Vrije Universiteit, Amsterdam, The Netherlands, downloaded Jun. 1, 2007, 16 pages.

White Paper, Network Processor Designs for Next-Generation Networking Equipment, EZchip Technologies, Dec. 27, 1999, 4 pages.

Lecture 14, G22.2243-001, "High Performance Computer Architecture," Stream Processing Architectures, Dec. 7, 2004, 5 pages.

Herlihy et al., "Obstruction-Free Synchronization: Double-Ended Queues as an Example," Brown University, downloaded Jun. 1, 2007, 8 pages.

Barth, "Using Atomic Data Structures for Parallel Simulation," CSAIL, Massachusetts Institute of Technology, Apr. 27, 1992, 12 pages.

RTC Magazine, "Communications Processors vs. Network Processors: Programmable Data Plane Approaches," RTC Group, 7 pages, May 31, 2007.

Kumar, "Holistic Design for Multi-Core Architectures," thesis, University of California, San Diego, 2006, 214 pages.

de Brujin et al., "Using Beltway Butlers for Efficient and Structure I/O," Vrije Universteit Amsterdam, Technical Report IR-CS-028, Sep. 2006, 15 pages.

Cavium OCTEON, "Multi-Core Network Service Processor," Cavium Networks, downloaded May 31, 2007, 39 pages.

Nguyen et al., "Path Diversity and Bandwidth Allocation for Multimedia Streaming," University of California, Berkeley, downloaded May 31, 2007, 4 pages.

Introduction to Internet Quality of Service (QoS), downloaded May 31, 2007, 32 pages.

Discolo et al., "Lock Free Data Structures Using STM in Haskell," downloaded Jun. 5, 2007, 17 pages.

Michael et al., "Simple, Fast, and Practical Non-Blocking and Blocking Concurrent Queue Algorithms," downloaded Jun. 1, 2007, 9 pages.

Feldman, "Getting Serious About Transactional Memory," HPC Wire, Jan. 12, 2007, 3 pages, downloaded Jun. 1, 2007.

Riddle, "Office Action," U.S. Appl. No. 11/766,634, sent Jul. 8, 2009, 26 Pages.

PCT/US2008/058390, International Search Report, Oct. 30, 2008.

Office Action for U.S. Appl. No. 11/766,634 dated Jan. 25, 2010.

* cited by examiner

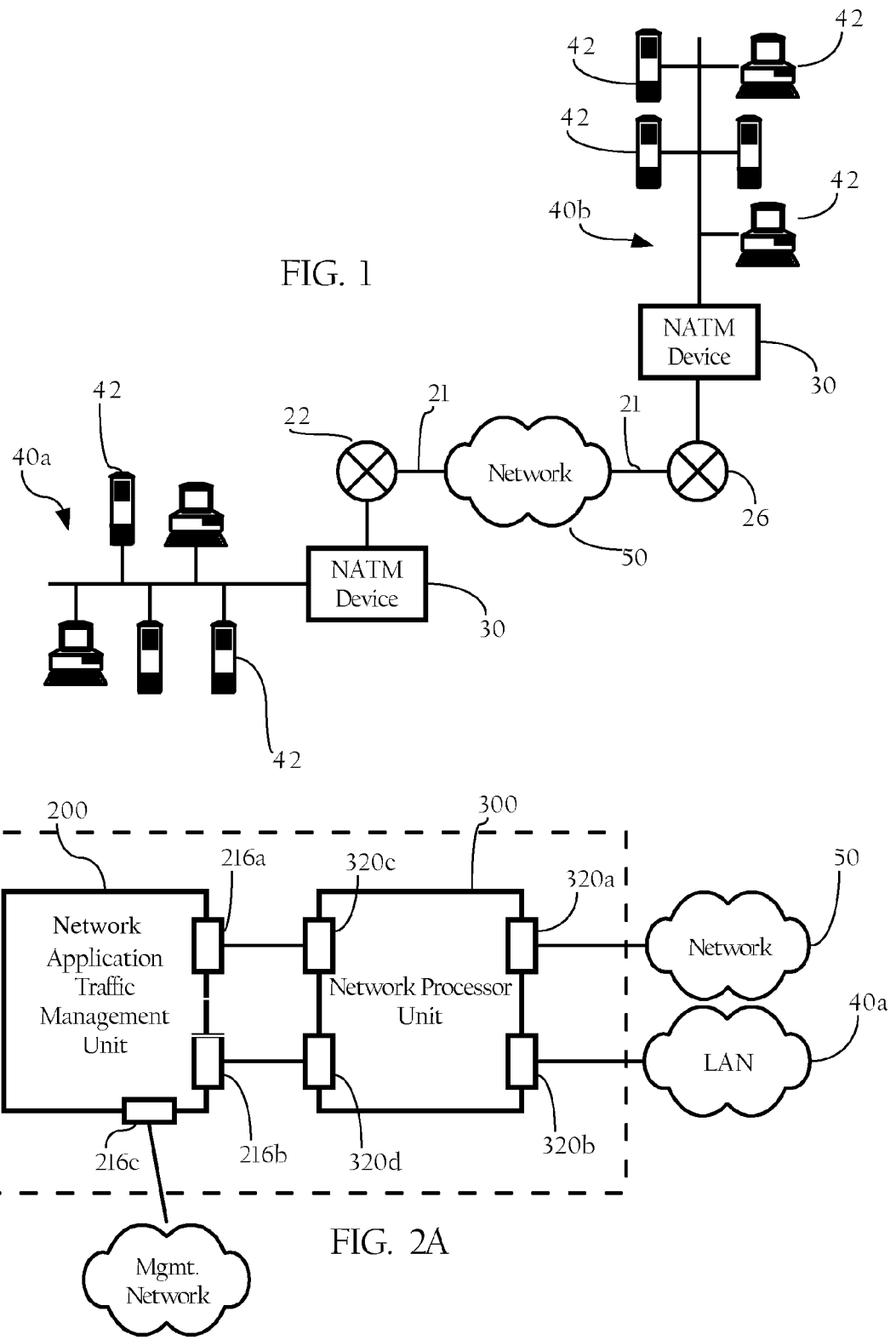

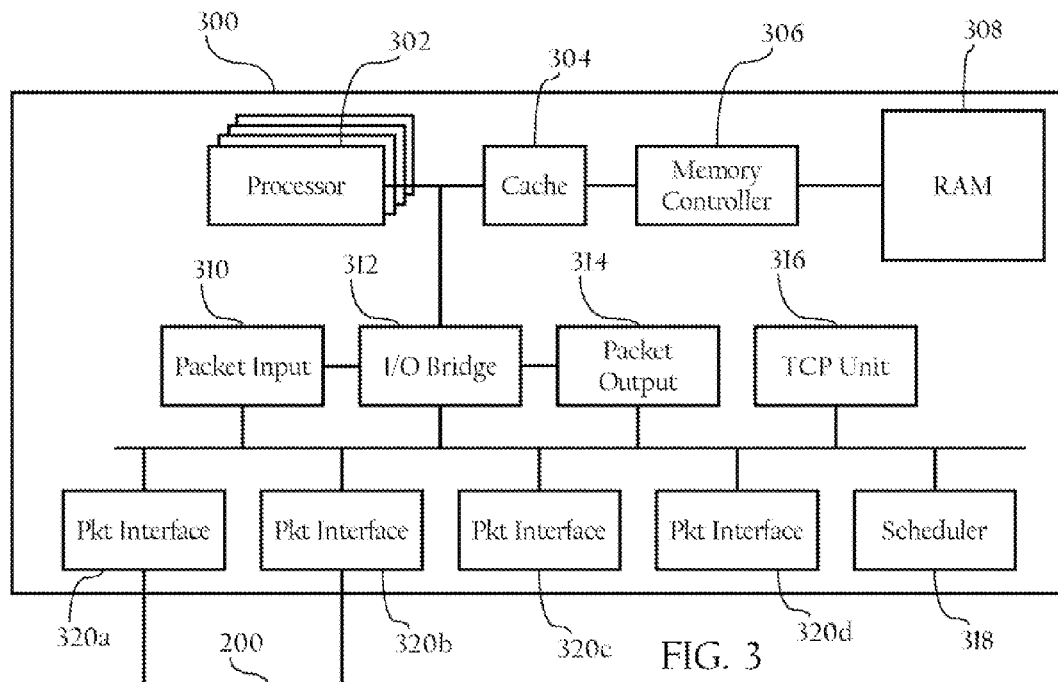
FIG. 3
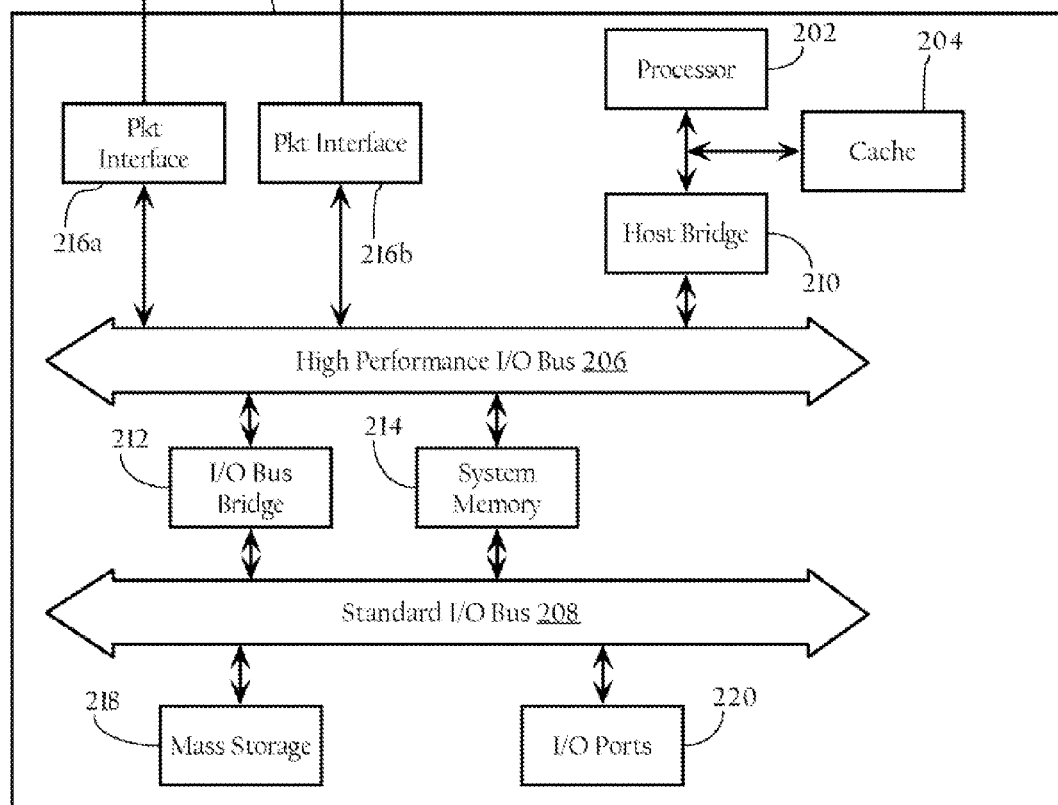

DATA AND CONTROL PLANE ARCHITECTURE FOR NETWORK APPLICATION TRAFFIC MANAGEMENT DEVICE

CROSS-REFERENCE TO RELATED APPLICATIONS AND PATENTS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,088,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 10/015,826 now U.S. Pat. No. 7,013,342 in the name of Guy Riddle, entitled "Dynamic Tunnel Probing in a Communications Network;"

U.S. patent application Ser. No. 10/039,992 now U.S. Pat. No. 7,032,072, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/198,051, in the name of Guy Riddle, entitled "Method for Automatically Determining a Traffic Policy in a Packet Communications Network;"

U.S. patent application Ser. No. 09/966,538, in the name of Guy Riddle, entitled "Dynamic Partitioning of Network Resources;"

U.S. patent application Ser. No. 11/053,596 in the name of Azeem Feroz, Wei-Lung Lai, Roopesh R. Varier, James J. Stabile, and Jon Eric Okholm, entitled "Aggregate Network Resource Utilization Control Scheme;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;"

U.S. patent application Ser. No. 10/917,952 in the name of Weng-Chin Yung, entitled "Examination of Connection Handshake to Enhance Classification of Encrypted Network Traffic;"

U.S. patent application Ser. No. 10/938,435 in the name of Guy Riddle, entitled "Classification and Management of Network Traffic Based on Attributes Orthogonal to Explicit Packet Attributes;"

U.S. patent application Ser. No. 11/019,501 in the name of Suresh Muppala, entitled "Probing Hosts Against Network Application Profiles to Facilitate Classification of Network Traffic;"

U.S. patent application Ser. No. 11/027,744 in the name of Mark Urban, entitled "Adaptive Correlation of Service Level Agreement and Network Application Performance;" and U.S. patent application Ser. No. 11/241,007 in the name of Guy Riddle, entitled "Partition Configuration and Creation Mechanisms for Network Traffic Management Devices."

TECHNICAL FIELD

This disclosure relates generally to network application traffic management.

BACKGROUND

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks. To that end, a variety of network devices have been created to provide data gathering, reporting, and/or operational functions, such as firewalls, gateways, packet capture devices, bandwidth management devices, application traffic monitoring devices, and the like. For example, the TCP/IP protocol suite, which is widely implemented throughout the world-wide data communications network environment called the Internet and many wide and local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, network security is another concern, such as the detection of computer viruses, as well as prevention of Denial-of-Service (DoS) attacks on, or unauthorized access to, enterprise networks. Accordingly, firewalls and other network devices are deployed at the edge of such networks to filter packets and perform various operations in response to a security threat. In addition, packet capture and other network data gathering devices are often deployed at the edge of, as well as at other strategic points in, a network to allow network administrators to monitor network conditions.

Enterprise network topologies can span a vast array of designs and connection schemes depending on the enterprise's resource requirements, the number of locations or offices to connect, desired service levels, costs and the like. A given enterprise often must support multiple LAN or WAN segments that support headquarters, branch offices and other operational and office facilities. Indeed, enterprise network design topologies often include multiple, interconnected LAN and WAN segments in the enterprise's intranet, and multiple paths to extranets and the Internet. Enterprises that cannot afford the expense of private leased-lines to develop their own WANs, often employ frame relay, or other packet switched networks, together with Virtual Private Networking (VPN) technologies to connect private enterprise sites via a service provider's public network or the Internet. Some enterprises also use VPN technology to create extranets with customers, suppliers, and vendors. These network topologies often require the deployment of a variety of network devices at each remote facility. In addition, some network systems are end-to-end solutions, such as application traffic optimizers using compression tunnels, requiring network devices at each end of a communications path between, for example, a main office and a remote facility.

Many of the network devices discussed above are typically deployed at strategic locations in the network topology such that all or nearly all network traffic flows through them. For example, firewall and intrusion detection systems are typically deployed at the edges of a network domain to filter incoming and outgoing traffic. Similarly, bandwidth management systems are typically deployed between a network and an access link to allow for more direct control of access link utilization. Given that these network devices may process large amounts of network traffic (especially during peak load conditions), they must possess sufficient computing resources to provide for sufficient performance and throughput. If the network device becomes a bottleneck, latency increases and degrades network application performance. Still further, the processes and functions performed by these network devices are becoming more complex and, thus, require higher processing power than previous generation systems. Indeed, bandwidth management systems, for example, have evolved to include complex packet inspection, classification and control mechanisms.

In some previous approaches to increasing the performance of network devices, vendors have simply relied on more powerful processors, frequently turning to customized hardware solutions. This approach, however, is inherently limited to the capability of the custom hardware. Custom hardware solutions also require increased development costs and long lead times, as well as limited flexibility for correcting bugs and adapting to changing customer requirements. In addition, while some network device manufactures have turned to systems with multiple processors, they have not addressed the challenges posed by QoS and other devices that employ stateful or flow-aware inspection, classification and control mechanisms.

DESCRIPTION OF THE DRAWINGS

FIG. 1 is a schematic diagram illustrating a computer network environment in which implementations of the invention may operate.

FIGS. 2A and 2B are schematic diagrams illustrating the interconnections between a network application traffic management device and a network processing unit according to particular implementations of the invention.

FIG. 3 is a functional block diagram that shows the components and system architecture of a network application traffic management device and a network processing unit according to one particular implementation of the invention.

DESCRIPTION OF EXAMPLE EMBODIMENTS

A. Overview

Figure 4A:
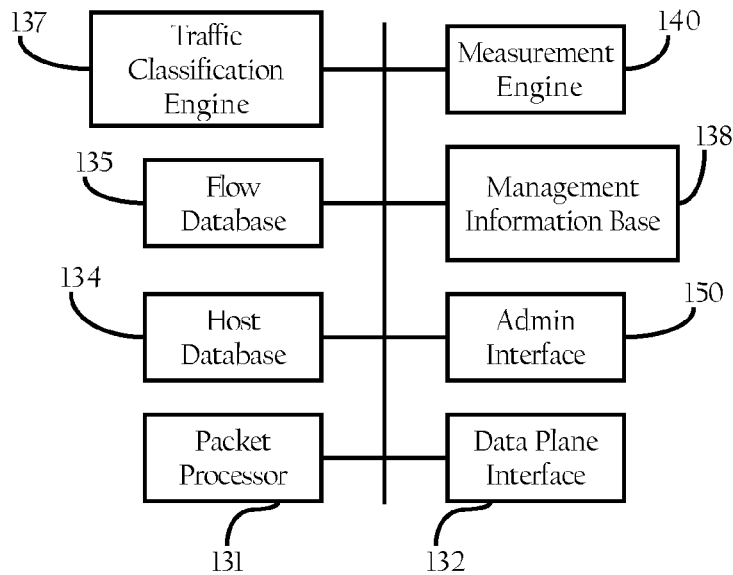
FIG. 4A is a schematic diagram illustrating logical processing modules of an application traffic management device according to one particular implementation of the invention.

The present invention provides methods, apparatuses and systems directed to a network device system architecture that increases throughput of devices that process network traffic. In a particular implementation, an example system architecture includes a network device implementing a control plane, that is operably coupled to a network processing unit implementing one or more data plane operations. In a particular implementation, the network processing unit is configured to process network traffic according to a data plane configuration, and sample selected packets to the network device. The network device processes the sampled packets and adjusts the data plane configuration responsive to the sampled packets. In particular implementations, the present invention is directed to methods, apparatuses and systems that use fast network processors to accelerate the operation of existing slower network device hardware platforms. As described herein, the architecture allows the bulk of network traffic processing to be offloaded to the fast network processor instead of the network device. In a particular implementation, the present invention provides a cost effective solution to increasing the throughput of existing hardware with little to no modification to the existing hardware and minimal changes to software or firmware with the use of an external appliance or device that implements a data plane can be used to increase the throughput of existing hardware with little to no modification to the existing hardware and minimal changes to software or firmware to implement control plane operations.

In the following description, specific details are set forth in order to provide a thorough understanding of particular implementations of the present invention. Other implementations of the invention may be practiced without some or all of specific details set forth below. In some instances, well known structures and/or processes have not been described in detail so that the present invention is not unnecessarily obscured.

A.1. Network Environment

FIG. 1 illustrates, for didactic purposes, a network 50, such as wide area network, interconnecting a first network 40*a*, supporting a central operating or headquarters facility (for example), and a second network 40*b*, supporting a branch office facility (for example). In one implementation, network 50 may include a MPLS VPN network core interconnecting networks 40*a* and 40*b*. Network 50 may also be operably connected to other networks associated with the same administrative domain as networks 40*a*, 40*b*, or a different administrative domain. Furthermore, network 50 may allow access to a variety of hosts over the Internet, as well. As FIG. 1 shows, the first network 40*a* interconnects several hosts or end systems 42, including personal computers and servers, and provides access to resources operably connected to computer network 50 via router 22 and access link 21. Access link 21 is a physical and/or logical connection between two networks, such as computer network 50 and network 40*a*. The computer network environment, including network 40*a* and network 50 is a packet-based communications environment, employing TCP/IP protocols (for example), and/or other suitable protocols, and has a plurality of interconnected digital packet transmission stations or routing nodes. First network 40*a*, and network 40*b*, can each be a local area network, a wide area network, combinations thereof, or any other suitable network.

As FIG. 1 illustrates, network devices 30, in one implementation, are deployed at the respective edges of networks 40*a* and 40*b*. In a particular implementation, network devices 30 are network application traffic management devices operative to manage network application traffic. As discussed below, network application traffic management devices 30 may include a number of different functional modules, such as compression modules, tunneling modules, rate control modules, gateway modules, protocol acceleration modules, and the like. In addition, network application traffic management devices 30 may include functions, such as compression and/or tunneling, where cooperation with a remote device (such as another network application traffic management device) is required, while also performing other functions that can be performed independently. However, the control and data plane system architecture according to the present invention can be integrated into a variety of network devices, such as proxies, firewalls, intrusion detection systems, packet capture or network monitoring equipment, VPN servers, web services network gateways or brokers, and the like.

A.2. Example System Architecture

FIG. 2A illustrates an example system architecture of network application traffic management device 30. In the implementation shown, network application traffic management device 30 comprises an application traffic management unit 200 and a network processing unit 300. Network application traffic management unit 200 may be implemented using existing hardware device platforms and functionality with small software modifications to interact with network processing unit 300. Network processing unit 300 interconnects with application traffic management unit as shown, and is further operably connected to network 50 and LAN 40*a*. In the implementation shown, network processing unit 300 is a discrete processing unit that does not share memory with network application traffic management unit 200, instead being interconnected via one or more network interfaces. In other implementations, the interconnections between network processing unit 300 and network application traffic management unit 200 can be implemented using other suitable interface technologies, such as other network interface technologies, and bus interfaces (e.g., Peripheral Component Interconnect (PCI) interfaces, and Industry Standard Architecture (ISA) interfaces). Furthermore, network application traffic management unit 200 and network processing unit 300 may be directly interconnected to each other with only network cabling extending between the packet interfaces. In another implementation, the packet interfaces of the network application traffic management unit 200 and network processing unit 300 may be connected to an Ethernet switch or other network fabric. The devices could use layer 2 or 3 tunneling protocols to transmit sampled packets to each other.

As FIG. 2A illustrates network application traffic management unit 200 comprises packet interfaces 216*a* and 216*b*, while network processing unit 300 comprises packet interfaces 320*a*-*d*. In one implementation, packet interfaces comprise Ethernet interfaces including MAC layer functionality. However, other network interfaces can be used depending on the network environment. Generally, packets received from network 50 on packet interface 320*a* are transmitted to network 40*a* from packet interface 320*b*, and vice versa. Network processing unit 300, generally speaking, may be configured to implement one or more data plane operations on the network traffic transmitted between network 50 and network 40*a* according to a data plane configuration. As discussed in more detail below, network processing unit 300 is configured to receive packets from network 50 or 40a and selectively sample received packets to network application traffic management unit 200 for processing. In one implementation, packets received on packet interface 320a, when sampled, are transmitted from packet interface 320c to packet interface 216a of network application traffic management unit 200. Network processing unit 300, in one implementation, then processes the packet without waiting for a response from network application traffic management unit 200. In a particular implementation, the network processing unit 300, given that it processes packets according to its current data plane configuration, can continue to process packets even when the control plane crashes and/or reboots. In other implementations, network application traffic management unit 200 can be configured to forward or emit some packets passed to it instead of the network processing unit 300. In addition, network application traffic management unit 200 may also be configured to emit probe messages and other messages directed to device discover, network management, and the like, directly as well. Application traffic management unit 200 performs various control plane operations on sampled packets, such as packet classification, policy identification, and the like. Responsive to one or more received sample packets, network application traffic management unit 200 may transmit one or more control messages to network processing unit 300 operative to cause changes to the data plane configuration of the network processing unit. For example, network application traffic management unit 200 may receive sampled packets of a data flow, and classify them to identify one or more policies or controls. Network application traffic management unit 200 may then transmit a control message identifying one or more traffic classification or service types and one or more policies to be applied to packets of the data flow. Network processing unit 300 may then apply the one or more policies to subsequent packets of the same data flow.

Figure 2B:
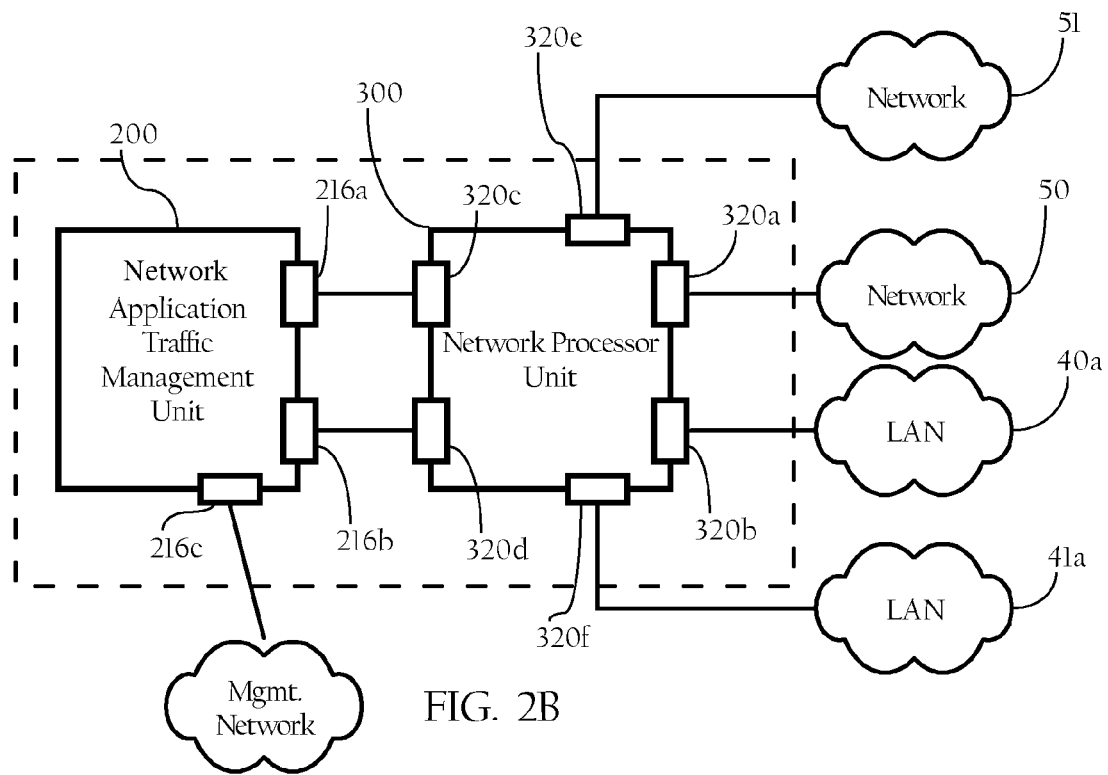

Other implementations are possible. For example, network application traffic management unit 200 and network processing unit 300 could be connected using a single pair of packet interfaces. In other implementations, network application traffic management unit 200 and network processing unit 300 could be connected with additional packet interfaces than that shown in FIG. 2A. For example, a packet interface pair between network application traffic management unit 200 and network processing unit 300 could be configured for each packet interface of network processing unit 300 that is connected to a network, such as an internal LAN or a WAN. As FIG. 2B shows, in another implementation, network processing unit 300 could be configured with multiple packet interfaces 320a, 320b, 320e, and 320f for communication with respective networks 50, 40a, 51 & 41a, and multiplex packets transmitted to an network application traffic management unit 200 over a smaller number of packet interfaces 320c and 320d.

In yet another implementation, a single network application traffic management unit 200 can be connected to multiple network processing units 300 disposed at various points in a network environment. For example, two network processing units 300 could be deployed on separate access links, and communicably coupled to a single network application traffic management unit 200. Conversely, a single network processing unit 300 could be operably coupled to multiple application traffic management units 200. In one such implementation, the network processing unit can be configured to ensure that packets of the same flow are transmitted to the same network application traffic management 200.

A.2.a. Network Application Traffic Management Unit

While network application traffic management unit 200 may be implemented in a number of different hardware architectures, some or all of the elements or operations thereof may be implemented using a computing system having a general purpose hardware architecture such as the one in FIG. 3. In one implementation, network application traffic management unit 200 comprises a processor 202, a cache memory 204, and one or more software applications and drivers directed to the functions described herein. In one implementation, network application traffic management unit 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Mass storage 218 and I/O ports 220 couple to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

Network interface 216c provides communication between network application traffic management unit 200 and a network through which a user may access management or reporting functions. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to network application traffic management unit 200.

Network application traffic management unit 200 may include a variety of system architectures; and various components of network application traffic management unit 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of network application traffic management unit 200 being coupled to the single bus. Furthermore, network application traffic management unit 200 may include additional components, such as additional processors, storage devices, or memories.

The operations of the network application traffic management unit 200 described herein are implemented as a series of software routines (see FIGS. 4A and 4b) hosted by network application traffic management unit 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216c. The instructions are copied from the storage device, such as mass storage 218, into memory 214 and then accessed and executed by processor 202.

An operating system manages and controls the operation of network application traffic management unit 200, including the input and output of data to and from software applications (not shown). The operating system provides an interface between the software applications being executed on the system and the hardware components of the system. According to one embodiment of the present invention, the operating system is a realtime operating system, such as PSOS, or LINUX. In other implementations, the operating system may be the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, and the like.

Figure 4B:
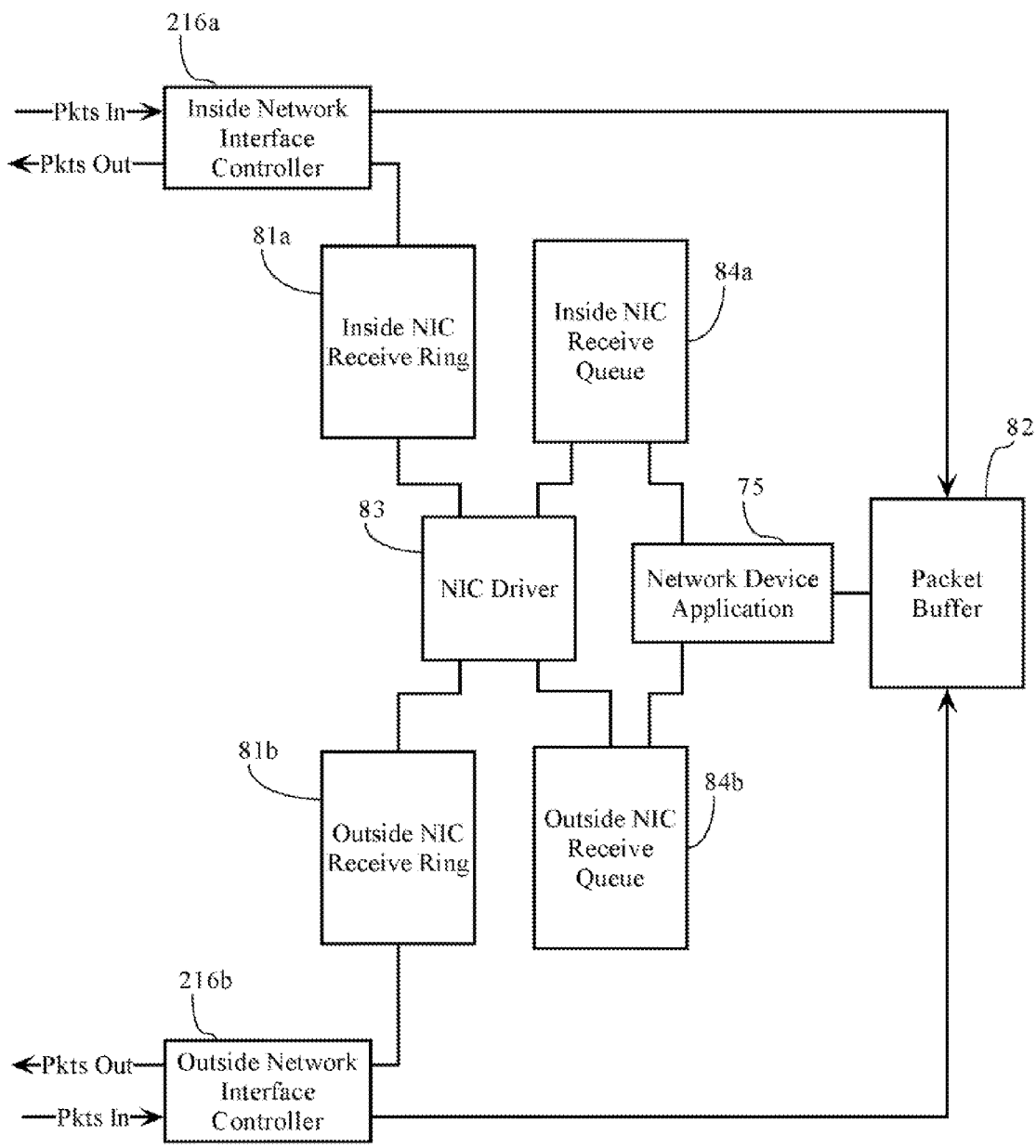
FIG. 4B is a functional block diagram illustrating a process flow, according to one implementation of the present invention, among various hardware and software modules of a network application traffic management unit.

FIG. 4B provides an illustration of the components and functional modules, and data structures, relevant to how packets are processed by network application traffic management unit 200. As FIG. 4B illustrates, network application traffic management unit 200 includes inside NIC receive ring 81a, outside NIC receive ring 81b, inside NIC receive queue 84a, outside NIC receive queue 84b, NIC driver 83, and packet buffer 82. Packet buffer 82 is operative to store packets received at packet interfaces 216a, 216b. To summarize the operations associated with receiving and ultimately processing packets, network interface 216a, for example, receives and stores a packet in packet buffer 82. Network interface 216a also maintains a pointer to the packet in inside NIC receive ring 81a. As discussed more fully below, NIC driver 83 determines whether to queue or otherwise retain the packet, or to discard it. In one implementation, NIC driver 83, operating at periodic interrupts, writes pointers out of inside NIC receive ring 81a and into inside NIC receive queue. Network application traffic management unit 200 operates substantially identically for packets received at outside packet interface 216b. Network device application 75, in one implementation, operates on packets stored in packet buffer 82 by accessing the memory address spaces (pointers) to the packets in inside NIC receive queue 84a and outside NIC receive queue 84b. As FIG. 3 illustrates, in one implementation, a packet received at inside packet interface 216a is generally transmitted, after processing by network device application, from outside packet interface 216b. The rings and other data structures supporting the transmission of packets from network interfaces 216a, 216b are not shown.

In one implementation, packet buffer 82 comprises a series of fixed-size memory spaces for each packet (e.g., 50,000 spaces). In other implementations, packet buffer 82 includes mechanisms allowing for variable sized memory spaces depending on the size of the packet. Inside NIC receive ring 81a is a circular queue or ring of memory addresses (pointers) corresponding to packets stored in packet buffer 82. In one implementation, inside NIC receive ring 81a includes 256 entries; however, the number of entries is a matter of engineering and design choice. In one implementation, each entry of inside NIC receive ring 81a includes a field for a memory address, as well as other fields for status flags and the like. For example, one status flag indicates whether the memory address space is empty or filled with a packet. Inside NIC receive ring 81a also maintains head and tail memory addresses, as described below. In one implementation, packet interface 216a also maintains the head and tail memory address spaces in its registers. The head memory address space corresponds to the next available memory space in packet buffer 82 to which the next packet is to be stored.

Accordingly, when packet interface 216a receives a packet, it checks the head address register to determine where in the system memory reserved for packet buffer 82 to store the packet. After the packet is stored, the status flag in the ring entry is changed to filled. In addition, the system memory returns a memory address for storing the next received packet, which is stored in the next entry in inside NIC receive ring 81a, in addition, the head address register is advanced to this next memory address. The tail memory address space corresponds to the earliest received packet which has not been processed by NIC driver 83. In one implementation, packet interface 216a also maintains a copy of inside NIC receive ring 81a in a memory unit residing on the network interface hardware itself. In one implementation, packet interface 216a discards packets when inside NIC receive ring 81a is full—i.e., when the tail and head memory addresses are the same.

As discussed above, NIC driver 83 is operative to read packet pointers from inside NIC receive ring 81a to inside NIC receive queue 84a. In one implementation, NIC driver 83 operates on inside NIC receive ring 81a by accessing the tail memory address to identify the earliest received packet. To write the packet in the inside NIC receive queue 84a, NIC driver 83 copies the memory address into inside NIC receive queue, sets the status flag in the entry in inside NIC receive ring 81a corresponding to the tail memory address to empty, and advances the tail memory address to the next entry in the ring. NIC driver 83 can discard a packet by simply dropping it from inside NIC receive ring 81a, and not writing it into inside NIC receive queue 84a. As discussed more fully below, this discard operation may be performed in connection with random early drop mechanisms, or the load shedding mechanisms, according to those described in U.S. application Ser. No. 10/848,185, incorporated by reference herein. Still further, NIC driver 83, in one implementation, is a software module that operates at periodic interrupts to process packets from inside NIC receive ring 81a to inside NIC receive queue 84a. At each interrupt, NIC driver 83 can process all packets in receive ring 81a or, as discussed more fully below, process a limited number of packets. Furthermore, as discussed more fully below, a fairness algorithm controls which of inside NIC receive ring 81a and outside NIC receive ring 81b to process first at each interrupt.

In one implementation, inside NIC receive ring 81a, outside NIC receive ring 81b, inside NIC receive queue 84a, outside NIC receive queue 84b, and packet buffer 82 are maintained in reserved spaces of the system memory of network application traffic management unit 200. As discussed above, network device application 75, operating at a higher level, processes packets in packet buffer 82 popping packet pointers from receive queues 84a, 84b. The system memory implemented in network application traffic management unit 200, in one embodiment, includes one or more DRAM chips and a memory controller providing the interface, and handling the input-output operations, associated with storing data in the DRAM chip(s). In one implementation, the hardware in network application traffic management unit 200 includes functionality allowing first and second network interfaces 216a, 216b to directly access memory 82 to store inbound packets received at the interfaces in packet buffer. For example, in one implementation, the system chip set associated with network application traffic management unit 200 can include a Direct Memory Access (DMA) controller, which is a circuit that allows for transfer of a block of data from the buffer memory of a network interface, for example, directly to memory 82 without CPU involvement. A variety of direct memory access technologies and protocols can be used, such as standard DMA, first-party DMA (bus mastering), and programmed I/O (PIO). In one implementation, each network interface 216a and 216b is allocated, a DMA channel to the memory 82 to store packets received at the corresponding interfaces.

In addition, the system chip set of network application traffic management unit 200, in one implementation, further includes an interrupt controller to receive and prioritize interrupt requests (IRQs) transmitted by devices over the system bus. Network application traffic management unit 200, in one implementation, further includes an interrupt timer that periodically transmits an interrupt signal to the interrupt controller. In one implementation, the interrupt controller, after receiving the periodic interrupt signal, dedicates the CPU and other resources to NIC driver 83 to process received packets as discussed above. In one implementation, the interrupt timer transmits interrupt signals every 50 microseconds; of course, this interval is a matter of engineering or system design choice. In certain implementations of the present invention, network interfaces 216a, 216b can transmit, demand-based interrupts after packets have arrived.

FIG. 4A is a block diagram illustrating functionality, according to one embodiment of the present invention, included in network application traffic management unit 200. In one embodiment, network application 75 of network application traffic management unit 200 comprises packet processor 131, data plane interface module 132, measurement engine 140, traffic classification engine 137, management information base (MIB) 138, and administrator interface 150. The co-pending and commonly owned patents and patent applications identified above describe various functions and operations that can be incorporated into network application traffic management unit 200. Packet processor 131 is operative to detect new data flows and construct data structures including attributes characterizing the data flow. Data plane interface module 132 is operative to generate control messages and transmit them to network processing unit 300, as well as receive packets (control messages and sampled packets) from network processing unit 300 and selectively forward sampled packets to packet processor 131. Traffic classification engine 137 is operative to analyze data flow attributes and identify traffic classes corresponding to the data flows. In one embodiment, traffic classification engine 137 stores traffic classes, in association with pointers to bandwidth utilization controls or pointers to data structures defining such bandwidth utilization controls. Management information base 138 is a database of standard and extended network objects related to the operation of network application traffic management unit 200. Measurement engine 140 maintains measurement data relating to operation of network application traffic management unit 200 to allow for monitoring of bandwidth utilization across access link 21 with respect to a plurality of bandwidth utilization and other network statistics on an aggregate and/or per-traffic-class level. Network application traffic management unit 200, in one embodiment, further includes a persistent data store (not shown), such as a hard disk drive, for non-volatile storage of data.

Administrator interface 150 facilitates the configuration of network application traffic management unit 200 to adjust or change operational and configuration parameters associated with the device. For example, administrator interface 150 allows administrators to select identified traffic classes and associate them with bandwidth utilization controls (e.g., a partition, a policy, etc.). Administrator interface 150, in one implementation, also displays various views associated with a traffic classification scheme and allows administrators to configure or revise the traffic classification scheme. Administrator interface 150 can be a command line interface or a graphical user interface accessible, for example, through a conventional browser on client device 42. In addition, since in one implementation, network processing unit 300 may not be a network addressable device and only responds to control messages transmitted from network application traffic management unit 200, administrator interface 150 provides a unified user interface for network application traffic management unit 200 and network processing unit 300 in the aggregate.

As disclosed in U.S. application Ser. No. 10/843,185, the number of packets in the inside or outside NIC receive queues 84a, 84b can be monitored to signal a possible overload condition. That is when the number of packets in one of the queues exceeds a threshold parameter, network application traffic management unit 200 may perform one or more actions. In one implementation, network application traffic management unit 200 may transmit a message to network processing unit 300 signaling that it is at or near an overload state. As described in more detail below, network processing unit 300 responsive to such a message may stop sampling packets to network application traffic management unit 200 or reduce the rate at which packets are sampled. Still further, as described in U.S. application Ser. No. 10/843,185, network application traffic management unit 200 may access host database 134 to compare certain observed parameters corresponding to the source hosts identified in received packets, and compare them against corresponding threshold values to determine whether to discard received packets. For example, a host identified as being part of a Denial-of-Service attack may be deemed a "bad host." In one implementation, network application traffic management unit 200 may transmit control messages to network processing unit 300 directing it to drop packets from an identified bad host.

When network application traffic management unit 200 operates without network processing unit 300 it generally operates to receive packets at a first interface (e.g., packet interface 216a), process the packets, and emit the packets at a second interface (e.g., packet interface 216a), or vice versa. When configured to operate in connection with network processing unit 300, however, network application traffic management unit 200 is configured to receive and process the packets sampled to it, but to drop the packets instead of emitting them. As part of this process, network application traffic management unit 200, in one implementation, receives a sampled packet, processes the packet, and may transmit one or more control messages to network processing unit 300 indicating how subsequent packets of a data flow should be handled.

A.2.b. Network Processing Unit

FIG. 3 also illustrates an example system architecture for a network processing unit 800 according to a particular implementation of the invention. In one implementation, network processing unit 300 includes a network processor having one to multiple processing cores. A network processor is an integrated circuit which has a processing feature set specifically adapted to the networking application domain. In one particular implementation, the network processor is a software programmable device allowing the feature set to be used in a flexible manner. One example of a network processor that can be used in the present invention is the Octeon™ Plus CN58XX 4 to 16-Core MIPS64-Based SoCs offered by Cavium Networks of Mountain View, Calif. Of course, any other suitable network processor can be used. In the implementation shown in FIG. 3, network processing unit 300 comprises processor 302 (comprising one to a plurality of processing cores), cache 304 (e.g., L2 cache shared among the processing cores), memory controller 306 and random access memory (RAM) 308. Network processing unit 300, in one implementation, further comprises packet input module 310, I/O bridge 312, packet output module 314, TCP unit 316, scheduler 318 (in one implementation, for packet scheduling and queuing-based Quality of Service (QoS)), and packet interfaces 320a-d. Network processing unit 300 may also include other functional modules such as a regular expression unit for string matching, a compression/decompression unit for accelerating network traffic, and an encryption unit. Still further, network processing unit 300, in some implementations, may include multiple network processors each having multiple processing cores.

Although not illustrated, in one implementation, network processing unit 300 may also include a power supply, RJ-45 or other physical, connectors, and a chassis separate from network application traffic management unit 200. For example, as discussed above, network processing unit 300 may be a separate physical unit in the form factor of a 1 U or 2 U appliance. The network processing unit 300 may be used to accelerate and enhance the throughput of an existing network application traffic management device, such as network application traffic management unit 200. In one implementation, without network processing unit 300, application traffic management unit 200 would be directly connected to the network path segment between network 50 and network 40a. For example, packet interface 216a would be operably connected to network 50, while packet interface 216b would be operably connected to network 40a. To increase throughput, however, network processing unit 300 may be interconnected as shown in FIGS. 2 and 3. As discussed in more detail below, network processing unit 300 can be configured to perform various data plane operations, and to selectively forward packets to application traffic management unit 200. In one possible configuration, application traffic management unit 200 performs higher-level processing of packets of respective data flows to classify the data flows and identify one or more policies to be applied to the data flows. Throughput can be increased, due to the capabilities of the network processing unit 300 to perform data plane operations on packets at wireline or near wireline speeds, and that network application traffic management unit 200 sees only a subset of all packets traversing networks 40a and 50. Accordingly, in one implementation, implementations of the invention provide for an inexpensive and easily deployable solution that accelerates the performance of existing hardware and allows an end-user to preserve investments in existing hardware platforms. In one such implementation, the network processing unit 300 can be distributed with a computer-readable media, such as optically or magnetically recorded disks or tapes, that include one or more software modules that, when installed, modify the operation of the network application traffic management unit 200 to interact with the network processing unit 300 as described herein. The computer-readable media may also include a copy of firmware for the network processing unit 300. In one implementation, network application traffic management unit 200 can store the firmware and provide it to network processing unit 300 during a configuration session. In other implementations, however, the network processing unit 300 and network application traffic management unit 200 may be incorporated into the same chassis.

B. Control Messages

As described herein, network application traffic management unit 200 (Control Plane) and network processing unit 300 (Data Plane) implement a two-way message path by which network application traffic management unit 200 directs network processing unit 300 which policies should be applied to the data flows traversing it. In a particular implementation, network processing unit 300 also returns network statistics, such as Measurement Samples, to be integrated into the measurement and reporting functionality of measurement engine 140 of network application traffic management unit 200. The Control Plane makes the flow decision after completing classification of the flow, including peeking at the data packets as necessary and consulting the policies stored in the traffic classification engine 137. Example network traffic classification mechanisms are described in U.S. application Ser. No. 11/019,501, as well as other patents and patent applications identified above.

Control messages between the network application traffic management unit 200 and network processing unit 300, in one implementation, use a specific VLAN to facilitate identification of control messages and other communications between them. In some implementations, VLAN tagging is not employed. Flow Information Messages have the same IP and TCP/UDP protocol headers as the flow they refer to in order to get the same tuple hash from the network processor hardware. Alternatively, flow information messages can be encapsulated in IP-in-IP or Generic Routing Encapsulation (GRE) or other tunneling protocols. Other control messages use specific addresses for the network application traffic management unit 200 and network processing unit 300. These are local to the two units (in one implementation, chosen from the 127 class A address range) and need no configuration.

In a particular implementation, there are 5 types of control messages from the Control Plane to the Data Plane, and 3 types of control messages in the reverse direction. The first message sent to the Control Plane is the SizingData message describing one or more attributes of various operational data structures, such as the sizes of tables. PartitionInfo messages are sent to describe the configuration of partitions, and any subsequent changes. A FlowInfo message is sent when network application traffic management unit 200 decides on the partition and policy to apply to a flow. Two message types, the OverloadStatus and the BadHostInfo inform the Data Plane when the network application traffic management unit 200 enters or leaves an overloaded condition and of any hosts the Load Shedding feature decides are behaving badly.

The three types of messages sent from the Data Plane to the Control Plane are the ReTransmitRequest to recover from possible lost messages or to resynchronize, the MeasurementSample message to transmit measurement samples for the configured traffic classes and partitions, and the LittleNote to transmit status messages to be logged.

Other message types may also be implemented for different functions. For example, one or more message types may be configured for compression functions, such as a message for setting up Layer 3 tunnels with remote nodes, and specifying the compression algorithm, to be used. Other message types may include encryption message types as well. In yet other embodiments, network application traffic management unit 200 may store a firmware image for network processing unit 300 and interact (typically during initialization) to determine the firmware image stored on network processing unit 300. Network application traffic management unit 200, if it determines that a firmware update is required, may transmit the firmware image to network processing unit 300 in one to a plurality of control messages.

B.1. SizingData Message

Network application traffic management unit 200 transmits a SizingData message to provide an initial configuration to the network processing unit 300. In a particular implementation, network processing unit 300 simply forwards received packets along the network path to their destination without processing, until it receives a configuration from the network application traffic management unit 200. The SizingData message indicates the capacities of the Control Plane. In a particular implementation, the Data Plane allocates its memory to be aligned with these capacities, such as the number of partitions, the number of supported traffic classes, the number of supported flow blocks. The following illustrates an example format of a SizingData message according to one particular implementation of the invention. In a particular implementation, objects, such as data flows, partitions, and classes are referenced relative to an index and an instance identifier.

```
       typedef struct __ObjectReference {
           uint16_t       index;
           uint16_t       instance;
       } ObjectReference;
       typedef struct __SizingData {
           uint16_t       type;
#define    kSizingDataType    787
           uint16_t       seq;          // sequence number
           uint32_t       ipaddr;       // main address of NATM
           uint32_t       pincount;     // # of partitions
           uint32_t       classcount;   // # of traffic classes
           uint32_t       flowcount;    // # of flow blocks
           uint16_t       servicecount; // # of services
       } SizingData, *SizingDataPtr;
```

B.2. PartitionInfo Message

Network application traffic management unit 200 sends PartitionInfo messages when a partition is created, deleted, moved, or resized. A PartitionInfo message can also be transmitted in response to a ReTransmitRequest message sent by the Data Plane (see below).

```
       typedef struct __PartitionInfo {
           uint16_t       type;
#define    kPartitionInfoType  789
           uint16_t       seq;
           ObjectReference  partition;   // this
                                         partition
           uint8_t        direction;
#define    kInboundDirection   0
#define    kOutboundDirection  1
           uint8_t        isroot;
           uint8_t        action;
#define    kPartitionActionNew       1
#define    kPartitionActionResize    2   // linkages unchanged
#define    kPartitionActionDetach    3   // detach, don't
                                         delete, uses old parent
#define    kPartitionActionReattach  4   // is detached, parent
                                         is new parent
#define    kPartitionActionDelete    5   // should be leaf,
                                         parent is old parent
#define    kPartitionActionRetransmit 6
           uint8_t        isdefault;
           ObjectReference  parent;
           uint32_t       minbw;
           uint32_t       maxbw;
       } PartitionInfo, *PartitionInfoPtr;
```

Some partition attributes in the PartitionInfo message include the minimum (minbw) and maximum (maxbw) bandwidth allocated to the partition, the identity of the parent of the partition, the direction of traffic flow (direction) to which the partition corresponds, and whether the partition is the default partition (isdefault) or root (isroot) for that direction.

B.3. FlowInfo Message

A major aspect of the control functions performed by the Control Plane is embodied in the FlowInfo message sent by the Control Plane when it has decided what policy or policies should be applied to a new data flow. In one implementation, the Control Plane is operative to create a data structure for the flow, and transmit a FlowInfo message to the Data Plane. The FlowInfo message causes the Data Plane to create a flow block, which is a data structure or object for storing various attributes of the data flow. The flow block is identified by a FlowIndex and an instance value. Attributes of the flow block may include one or more of the attributes defined in the FlowInfo message set forth below. The following illustrates attributes that may be included in a FlowInfo message according to one particular implementation of the invention.

```
       typedef struct __FlowInfo {
           uint16_t       type;
#define    kFlowInfoType     788
           uint16_t       seq;
           uint32_t       flowindex;     // identifies flows
           uint16_t       flowinstance;
           uint8_t        sendmore;      // keep sending packets
           uint8_t        policies[2];
#define    kPolicyPriority   0x01
#define    kPolicyRate       0x86        // any of these bits
#define    kPolicyPassThru   0x08
#define    kPolicyDiscard    0x10
#define    kPolicyNever      0x20
           ObjectReference  classes[2];   // by direction
           ObjectReference  partitions[2];
           uint8_t        priorities[2];
           uint8_t        direction;     // to hash flow
                                         attribute tuple
       } FlowInfo, *FlowInfoPtr;
```

Each data flow is identified by its FlowIndex, a number uniquely determined by which flow block (TCB or UCB type) was allocated to it by the Control Plane. The FlowInfo message, in a particular implementation, contains the determined policy (for example, one of Priority, Rate, PassThru, Discard, or Never). In one particular implementation, there are policies for each direction ("inbound" and "outbound") or "half-flow" of the traffic flow. There are also two traffic class indices, partition numbers, and priorities in the FlowInfo message.

The FlowInfo message may also contains control variables related to interaction between the Control Plane and Data Plane relative to the data flow. For example, the Control Plane may set the sendmore variable to false to indicate that the Data Plane should completely take over handling packets of the data flow. For example, as described in more detail below, the Data Plane will continue to sample packets of a data flow to the Control Plane until it receives a FlowInfo message for that data flow, where the sendmore variable is set to "false." If the sendmore variable is set to true, the Data Plane will continue to sample packets to the Control Plane until the Control Plane transmits another FlowInfo message with sendmore set to false. In a particular implementation, when packet sampling stops for a given data flow is defined by the Control Plane, which can use this mechanism to implement one or more value added features, such as packet capture. For example, if a data flow hits a traffic class with packet capture enabled, the Control Plane can set sendmore to true and never clear it for the life of the data flow. Anything that required the Control Plane to handle all the packets of a flow could be handled in this manner.

In a particular implementation, FlowInfo messages have the same IP and TCP/UDP protocol headers as the data flow, to which they refer. In such a configuration, the network processing unit 300 computes the same hash value for the 5-tuple (see below) of header attributes that are used to identify data flows. Network processing unit 300 has functionalities that allow for the packets of the same data flow to be processed by a common processor core. Addressing the Flow- Info messages in this manner allows the control messages for a flow to be processed by the same processor core handling data packets of the flow. Alternatively, the attributes of the 5-tuple for the data flow can also be included in the FlowInfo message, and the addresses in the headers can correspond to the addresses of the Data Plane and Control Plane.

B.4. OverloadStatus and BadHostInfo Messages

The Control Plane uses the OverloadStatus and BadHostInfo messages to control the flow of sampled packets from the Data Plane. The following defines the formats of the OverloadStatus and BadHostInfo messages according to an implementation of the invention.

```
        typedef struct __OverloadStatus {
            uint16_t            type;
#define     kOverloadStatusType 791
            uint16_t            seq;
            uint8_t             overloaded;
        } OverloadStatus, *OverloadStatusPtr;
        typedef struct __BadHostInfo {
            uint16_t            type;
#define     kBadHostType        792
            uint16_t            seq;
            uint32_t            ipaddr;
            uint8_t             client;
            uint8_t             direction;
        } BadHostInfor, *BadHostInfoPtr;
```

In one implementation, the Data Plane is not configured with a "maximum rate" the Control Plane is capable of handling. Rather, the Control Plane learns this from the OverloadStatus messages sent from the Control Plane when it senses an overload condition, such as a threshold number of packets in one or more receive queues. This signaling scheme allows the Data Plane to automatically adjust to interfacing with other models of a network application traffic management unit 200 or recognizing that different network traffic mixes may place different loads on the classification mechanisms of the Control Plane.

In a particular implementation, the Control Plane also indicates to the Data Plane when hosts are behaving badly. For example, the Control Plane may send a BadHostInfo message to inform the Data Plane of any hosts the Load Shedding feature decides are behaving badly. The Data Plane can reduce or block traffic for a period of time in response to the BadHostInfo messages. In one implementation, the Data Plane can grow the packet rate sampled to the Control Plane (relative to a given host) until it receives a subsequent BadHostInfo message from the Control Plane.

B.5. ReTransmitRequest Message

As discussed above, the Data Plane may also transmit messages to the Control Plane. For example, the Data Plane may send a ReTransmitRequest message that lets the Data Plane ask for a replay of certain of the downward control messages. In a particular implementation, the Data Plane may transmit a ReTransmitRequest message each time it sees an object referenced in a control message for which it has no information. For example, the Data Plane may request a replay of the SizingData message, which may get lost while the Control Plane is booting up, or the OverloadStatus message, which might get lost in an overload condition, and the PartitionInfo message, which is helpful for resynchronization when the Control Plane comes up after the Data Plane.

ReTransmitRequest messages also facilitate resynchronization between the Control Plane and the Data Plane in the event of a fault or crash of either the Data Plane or the Control Plane. The following illustrates the format of a ReTransmitRequest message according to one particular implementation of the invention.

```
        typedef struct __ReTransmitRequest {
            uint16_t    type;
#define     kRetransmitType     775
            uint16_t    seq;
            uint16_t    what;           // message type to resend
            uint16_t    index;          // partition index
                                        (kPartitionInfoType)
        } RetransmitRequest, *ReteansmitRequestPtr;
```

B.6. MeasurementSample Message

In one implementation, the Control and Data Planes implement a measurement data signaling scheme to allow measurement engine 140 to maintain network statistics relative to data flows, partitions and traffic classes. In a particular implementation, the Data Plane transmits MeasurementSample messages to the Control Plane such that it can update the values of various statistics it maintains. The following illustrates the format of a MeasurementSample message according to one possible implementation of the invention.

```
        typedef struct __MeasurementSample {
            ObjectReference         obj;
            uint32_t                packets;
            uint32_t                bytes;
        } MeasurementSample, *Measurement SamplePtr;
        typedef struct __MeasurementData {
            uint16_t                type;
#define     kMeasurementDataType            777
            uint16_t                seq;
            uint16_t                count;
            uint8_t     flavor;
#define     kMeasurementFlavorPartition     1
#define     kMeasurementFlavorClass         2
#define     kMeasurementFlavorService       3
            uint8_t     pad;
            MeasurementSample       samples[1];     //count
                                                    samples here
        } dMeasurementData, *MeasurementDataPtr;
```

In one implementation, the Data Plane maintains byte and packet counts per traffic class and per partition (excluding the "sampled" packets which the Control Plane has already counted). On a periodic basis, a background task will bundle up samples for active classes and partitions, and forward the data back to the Control Plane for recording in MeasurementSample messages.

B.7. LittleNote Message

For diagnostic purposes, the Control Plane may send log data (such as "printf" output) LittleNote messages. At the Control Plane, the events may be logged into the Control Plane "system event" log as well as copied to any configured syslog servers. The following illustrates the format, of a LittleNote message according to one possible implementation of the invention.

```
        typedef struct __LittleNote {
            uint16_t            type;
#define     kLittleNoteType     779
```

```
        uint16_t        seq;
        uint8_t         level;      // SYSLOG_LEVEL
#define kNoteEmerg      0
#define kNoteAlert      1
#define kNoteCrit       2
#define kNoteErr        3
#define kNoteWarning    4
#define kNoteNotice     5
#define kNoteInfo       6
#define kNoteDebug      7
        uint8_t         pad;
        uint16_t        reserved;
        char            note[1];    // null terminated    } LittleNote,
*LittleNotePtr;
```

C. Example Process Flows

Figure 5:
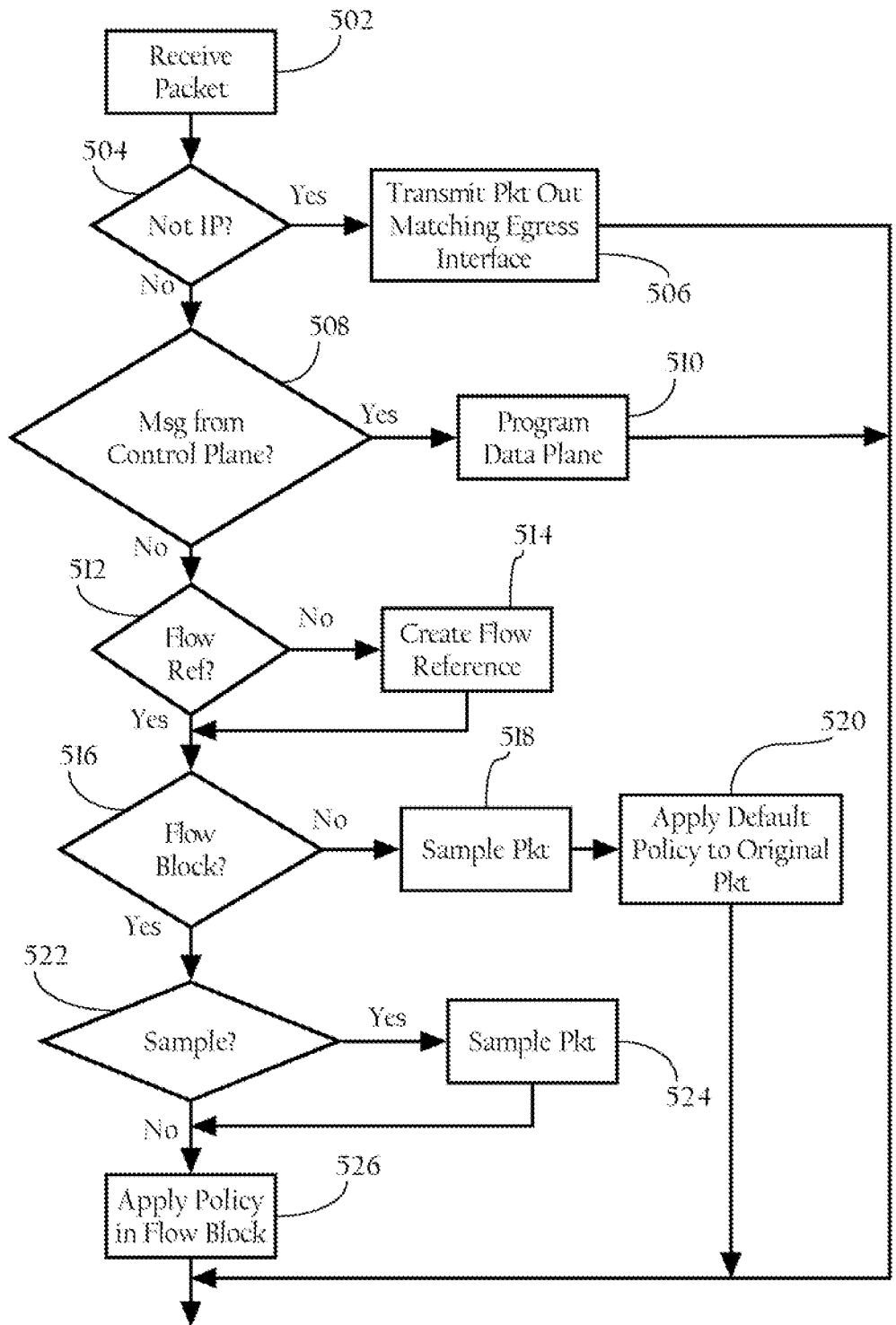
FIG. 5 is a flow chart setting forth a method, according to one possible implementation of the invention, directed to processing flows at a network processing unit.

FIG. 5 illustrates an example process flow, according to one possible implementation of the invention, executed by the network processing unit 300. When network processing unit 300 receives a packet (502), the hardware of the network processing unit 300 includes a packet parsing logic circuit that parses a received packet and computes a hash of an attribute tuple of the received packet. In one implementation, the tuple comprises the source IP address, destination IP address, source port number, destination port number, and a protocol identifier. Network processing unit 300 uses this 5-tuple to identify different data flows between hosts. In one implementation, the values of these fields are arranged in an order, depending on the direction the packet is traveling, to ensure that the resulting hash is the same for data flows of the packet transmitted in either direction. In one implementation, the hardware-computed hash is a weak 16-bit hash. A strong hash of the same 5-tuple is also computed to identify the data flow. In one implementation, the weak hash computed by hardware may map to one or more strong hashes. To identify a data flow, the weak hash essentially narrows the search space to a subset of the strong hashes that are mapped to the weak hash.

As FIG. 5 illustrates, if the received packet is not an IP packet (504), network processing unit 300 forwards the packet along toward its destination from an egress interface that corresponds to the packet interface on which the packet was received (506). In other implementations, network processing unit 300 and the control plane can be configured to process non-IP packets as well. Furthermore, if the received packet is a control message (see above) from the Control Plane (508), network processing unit 300 passes the control message to a process that programs the data plane by changing one or more attributes of the data plane configuration (510). For example, network processing unit 300 may create a flow block in response to a FlowInfo message. In one implementation, flow blocks are identified by the FlowIndex values of FlowInfo messages. Otherwise, network processing unit 300 determines whether it has a flow reference that matches the hash it previously computed for the packet (512). If not, network processing unit 300 creates a flow reference in response to the data packet (514). Flow reference includes a key (typically a strong hash of the 5-tuple attribute values, see above), a FlowIndex value (indexing into an array or table (or other data structure) of flow blocks, and a flow instance identifier. When initially created, the flow reference includes a null FlowIndex value, which may subsequently be modified to index to a flow block when created.

As FIG. 5 illustrates, network processing unit 300 may be configured to sample packets to network application traffic management unit 200 (518), if there is no flow block created for the data flow (516). If there is no flow block for the data flow, network processing unit 300 may apply one or more default policies to the packet (520). For example, network processing unit 300 may assign the packet to a default partition having a maximum bandwidth parameter enforced by scheduler 318. If a flow block exists (516), network processing unit 300 determines whether to sample the packet to network application traffic management unit 200 (522, 524). For example, the sendmore attribute of the flow block may be set to true. In addition, the received packet may be a data flow or connection-terminating packet (such as a TCP FIN or EST). In a particular implementation, network processing unit 300 is configured to transmit connection-initiating (e.g., handshake or TCP SYNs and SYN/ACKs), and connection-terminating packets (e.g., TCP FINs, RSTs, etc.) to allow network application traffic management unit 200 to set up and tear down data structures as required. Lastly, as FIG. 5 illustrates, network processing unit 300 applies one or more policies identified in the flow block to the packet (526). For example, the flow block may identify a partition, or a priority policy. The flow block may also identify other policy types, such as a diffserv or tagging policy.

In one implementation, the internal processes of network application traffic management unit 200 assume that a data flow has terminated if a packet associated with the data flow has not been encountered in a threshold period of time. Termination of a data flow may cause the network application traffic management unit 200 to tear down various data structures for the data flow (to allow the memory space to be used for other data flows). In such implementations, the network processing unit 300 may be configured to periodically sample packets to network application traffic management unit 200 (even after sendmore has been set to false) to ensure that the network application traffic management unit 200 does not deem the flow terminated. The rate at which these packets are sampled will depend on the configuration of the network application traffic management unit 200 and the threshold values it uses to deem flow terminated. In such an implementation, the decisional logic represented in 522 of FIG. 5 can be augmented to include a check that compares the last sample time to the current time and to conditionally sample the packet if the time difference is greater than a threshold.

C.1. Packet Sampling

Figure 6:
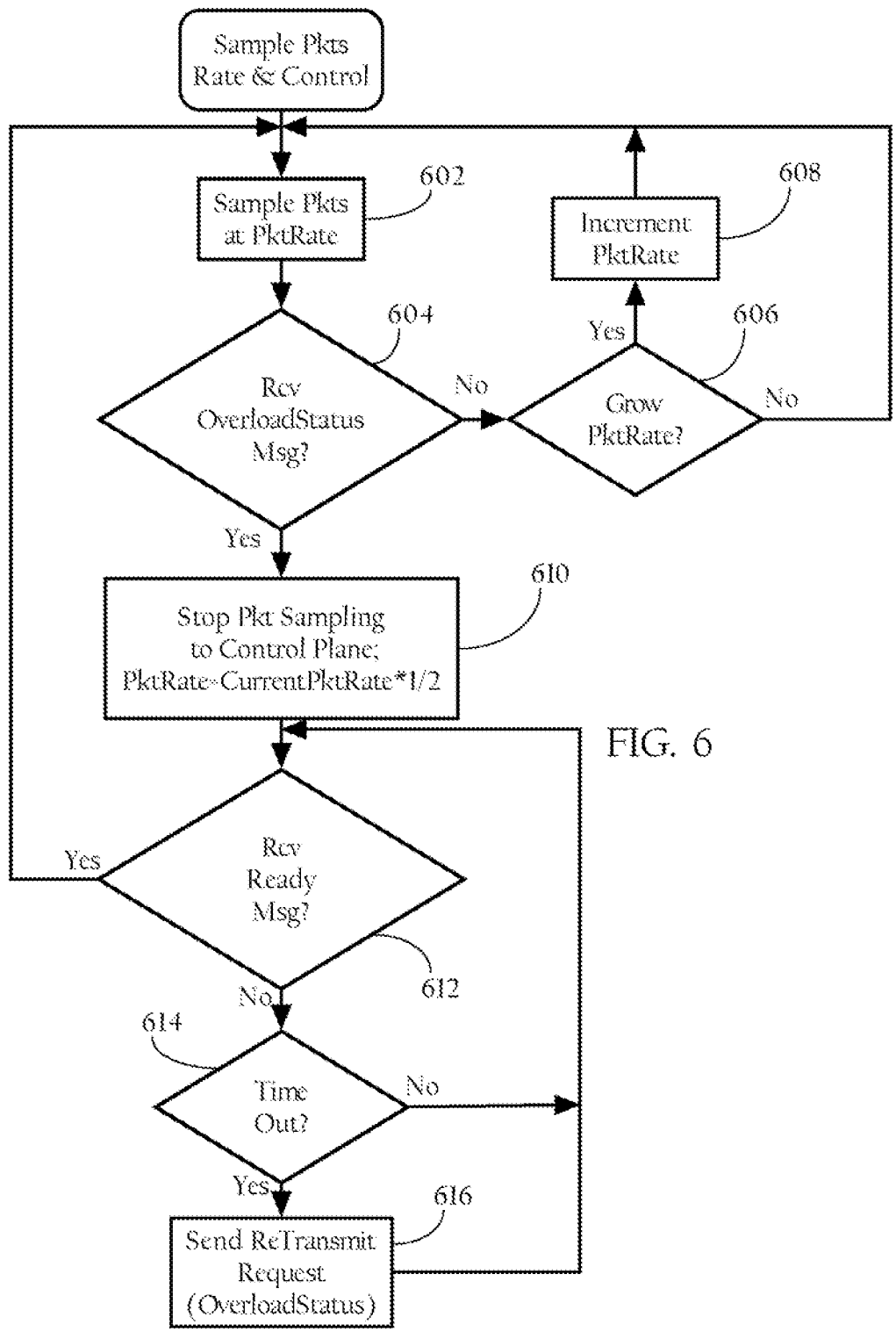
FIG. 6 is a state diagram, according to a particular implementation of the invention, directed to controlling the sampling of packets, and the rate at which packets are sampled, to a network application traffic management device.
Figure 7:
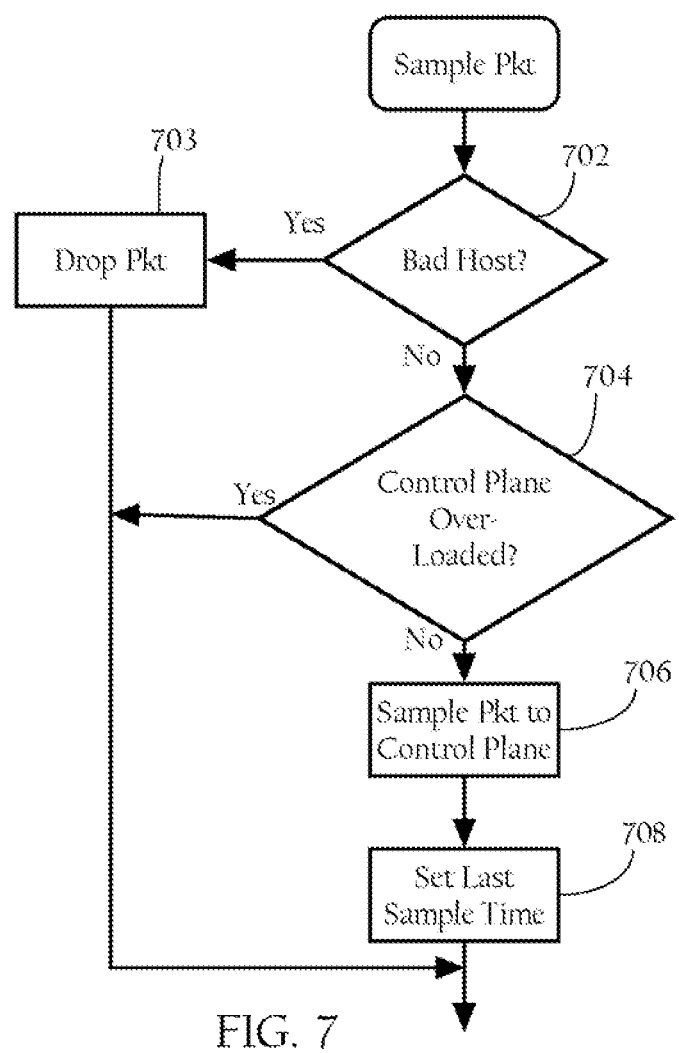
FIG. 7 is a flow chart illustrating a method directed to sampling packets.

FIGS. 6 and 7 set forth process flows, according to one particular implementation of the invention, directed to sampling packets to network application traffic management unit 200. FIG. 6 is a state diagram showing when, and the aggregate rate at which, packets across all data flows are sampled to network application traffic management unit 200. FIG. 7 illustrates a process implemented by the control plane when sampling packets to network application traffic management unit 200.

As FIG. 8 provides, network processing unit 300 is configured to sample packets to network application traffic management unit 200 at a packet sampling rate (602). If the number of packets to be sampled would exceed the current packet sampling rate, network processing unit 300 samples a subset of the packets. For example, if network processing unit 300 receives during a given interval 100 packets to be sampled per second, and the current sampling rate is 50 packets per second, network processing unit 300 would not sample 50 of the packets in a one-second interval. Selection of which packets to sample or not can be based on one or more sampling policies, the details of which are beyond the scope of this disclosure. As FIG. 6 illustrates, as long as the network processing unit 300 does not receive an OverloadStatus message indicating that network application traffic management unit 200 is overloaded (604), it continues sampling packets at the packet sampling rate, periodically growing the packet sampling rate (606, 608). However, if network processing unit 300 receives an OverloadStatus message indicating that network application traffic management unit 200 is overloaded (604), it stops sampling packets to network application traffic management unit 200 and decreases the packet sampling rate (in one implementation, by half of the current sampling rate) (610). As FIG. 6 shows, network processing unit 300 discontinues packet sampling until it receives an OverloadStatus message indicating that network application traffic management unit 200 is ready to receive packets (612). In the implementation shown, network processing unit 300 may also transmit a ReTransmitRequest (616) asking for an OverloadStatus message at periodic intervals (614).

As illustrated in FIG. 7, network processing unit 300 may be configured to conditionally sample packets to network application traffic management unit 200. For example, if a host identified in the packet is identified as a bad host in a BadHostInfo message (702), network processing unit 300 may drop the packet entirely (703), or pass the packet to a process that decides whether to drop the packet or pass the packet through. Furthermore, if network application traffic management unit 200 is currently overloaded (704), network processing unit 300 does not sample the packet. Otherwise, network processing unit 300 samples the packet to network application traffic management unit 200 (706), and resets a last sample time value of the flow block. The last sample time value can be used to control sample of packets, such as the leaking of packets to network application traffic management unit 200, see above. As discussed above, in one implementation, network processing unit 300 samples the packet by transmitting it to network application traffic management unit 200. Network processing unit 300 then resumes processing of the packet, such as applying one or more policies.

In the implementation described above, a large portion of the network processing is offloaded to the network processing unit 300, which with its dedicated hardware-level processing features allows for faster processing of network traffic. In the implementation described above, the network processing unit 300 handles network traffic using pre-existing programming. If it does not have a record of a flow and its class, policy, or partition, it applies defaults to the traffic, and samples the traffic to the network application traffic management unit 200. In this manner, the performance requirements on the network traffic management unit 200 are significantly reduced since it sees only a limited subset of the traffic (typically, the initial packets, one or more leaked packets to prevent flow termination processes of the Control Plane, and possibly terminating packets of a data flow). The network application traffic management unit 200 can classify the traffic fully and report back the class, partition, and policy of the data flow when it is done. In the meantime, the network processing unit 300 continues to use defaults until it receives programming for the specific flow. Once programming is received, it handles the traffic using the policies specified by the network application traffic management unit 200.

The present invention has been explained with reference to specific embodiments. For example, the functions performed by network processing unit 300 can be extended to include compression and network acceleration technologies. For example, network processor units may have hardware-based compression on chip. In such an implementation, network processing unit 300 can be configured to forward all tunnel discovery, set up and management messages to network application traffic management unit 200 which processes the messages and transmits tunnel control messages to network processing unit 300. The tunnel control messages may specify the IP address of the tunnel endpoint, the compression algorithm to use, and the like. In such an implementation, the FlowInfo messages can be extended to identify which tunnel the packets of the data flow are to be placed. Still further, in some implementations, the control plane may be implemented by one or more cores of a multi-core processor, while the data plane may be implemented by one or more remaining cores of the multi-core processor. In other implementations, the control plane and data plane can be implemented on the same physical host but on separate virtual machines. Other embodiments will be evident to those of ordinary skill in the art. It is therefore not intended that the present invention be limited, except as indicated, by the appended claims.

What is claimed is:

1. An apparatus comprising
a control plane; and
a network processing unit comprising a processor to execute instructions to configure the network processing unit to:
apply one or more policies to received packets of respective data flows through a plurality of ports according to a data plane configuration;
sample the received packets of the respective data flows to the control plane at a first sampling rate;
discontinue sampling of the received packets for all the respective data flows in response to receiving from the control plane a control message signaling discontinuance of the sampling of packets;
wherein the control plane is configured to:
process the received packets of the respective data flows sampled by the network processing unit;
transmit control messages to the network processing unit to change the data plane configuration, the control messages to indicate an overload condition;
wherein:
at least some of the control messages each identify a data flow of the respective data flows and signal the discontinuance of the sampling of the packets for all the respective data flows;
the data flows are identified by a combination comprising a source Internet Protocol address and a destination Internet Protocol address; and
the network processing unit is further configured to:
discontinue sampling of received packets responsive to a control message indicating the overload condition; and resume sampling of packets at a second sampling rate less than the first sampling rate applied before sampling was discontinued.

2. The apparatus of claim 1, wherein:
the data plane configuration comprises a default policy;
one or more control messages identify one or more policies for respective data flows; and
the network processing unit is further configured to apply a current data plane configuration to all received packets.

3. The apparatus of claim 2 wherein the one or more policies include partition identifiers for respective data flows.

4. The apparatus of claim 1 wherein the network processing unit is further configured to sample connection-initiating packets of respective data flows to the control plane.

5. The apparatus of claim 1 wherein the network processing unit is further configured to sample the initial packets of respective data flows to the control plane.

6. The apparatus of claim 1 wherein the network processing unit is further configured to sample connection-terminating packets of respective data flows to the control plane.

7. The apparatus of claim 1 wherein the network processing unit is further configured to periodically sample packets of respective data flows to the control plane.

8. The apparatus of claim 1 wherein the control plane is further configured to:
classify the respective data flows based on the sampled packets;
identify one or more policies for the respective data flows; and
provide the identified policies for the respective data flows in the control messages transmitted to the network processing unit.

9. The apparatus of claim 1 wherein the network processing unit is further configured to:
maintain one or more network statistics based on received packets; and
transmit the one or more network statistics to the control plane in one or more control messages.

10. The apparatus of claim 9 wherein:
the control plane is configured to maintain network statistics on sampled packets; and
the network statistics transmitted to the control plane in the one or more control messages omit information corresponding to sampled packets.

11. The apparatus of claim 1 wherein the control plane is a network application traffic management unit.

12. The apparatus of claim 1 further comprising a second network processing unit comprising a processing and configured to:
apply one or more policies to received packets of respective data flows according to a second data plane configuration;
selectively sample the received packets of the respective data flows to the control plane;
wherein the control plane is further configured to:
process packets sampled by the second network processing unit; and
transmit control messages to the second network processing unit to change the second data plane configuration.

13. The apparatus of claim 1 further comprising a second control plane configured to:
process packets sampled by the network processing unit; and
transmit control messages to the network processing unit to change the data plane configuration.

14. The apparatus of claim 13 wherein the network processing unit is further configured to sample packets of a given data flow exclusively to either the first or second control planes.

15. The apparatus of claim 1 wherein the network processing unit is further configured to increase the first sampling rate until receipt of a control message indicating an overload condition.

16. The apparatus of claim 1 wherein the control plane is further configured to transmit control messages identifying a bad host; and wherein the network processing selectively discards received packets associated with the bad host.

17. The apparatus of claim 1 wherein the control plane is housed in a first enclosure, and the network processing unit is external to the first enclosure.

18. The apparatus of claim 1 wherein the control plane is further configured to transmit retransmission request messages identifying one or more objects referenced in control messages transmitted from the control plane for which it has no configuration information.

19. The apparatus of claim 1 wherein the network processing unit is further configured to resume
sampling of packets at the second sampling rate further in response to leaving the overload.

20. The apparatus of claim 1 wherein the network processing unit is further configured to
discontinue sampling of received packets responsive to a control message indicating an overload condition while maintaining respective data flows according to the data plane configuration.

21. The apparatus of claim 1 wherein the network processing unit is further configured to
resumes sampling of packets from the same data plane configuration.

22. An apparatus, comprising
a memory;
one or more processors;
one or more network interfaces; and
a firmware application comprising instructions for causing the one or more processors to:
apply one or more policies to received packets of respective data flows through a plurality of ports according to a data plane configuration;
sample the received packets of the respective data flows to a control plane at a first sampling rate;
receive one or more first control messages from the control plane and update the data plane configuration according to information contained in the one or more first control messages;
discontinue sampling of the received packets for a given data flow in response to receiving from the control plane one or more first control messages identifying the given data flow, indicating an overload condition, and signaling discontinuance of the sampling of packets for the given data flow until one or more second control messages to resume sampling of the received packets are received, the second control messages to indicate the control plane has left the overload condition;
receive one or more second control messages; and
resume sampling of the received packets for the given data flow at a second sampling rate less than the first sampling rate applied before sampling was discontinued;
wherein the data flows are identified by a combination comprising a source Internet Protocol address and a destination Internet Protocol address.

23. The apparatus of claim 22 wherein the apparatus further comprises a packet parsing logic circuit that parses received packets into one or more attribute values.

24. The apparatus of claim 22, further comprising instructions for causing the one or more processors to sample connection-initiating packets of respective data flows to the control plane.

25. The apparatus of claim 22, further comprising instructions for causing the one or more processors to sample connection-terminating packets of respective data flows to the control plane.

26. The apparatus of claim 22, further comprising instructions for causing the one or more processors to sample packets of respective data flows to the control plane.

27. Logic encoded in one or more non-transitory computer readable media, wherein the logic, when executed causes one or more processors to
apply one or more policies to received packets of respective data flows through a plurality of ports according to a data plane configuration;
sample the received packets of the respective data flows to a control plane at a first sample rate;
receive one or more first control messages from the control plane and update the data plane configuration according to information contained in the one or more control messages;
discontinue sampling of the received packets for a given data flow in response to receiving from the control plane one or more first control messages identifying the given data flow, indicating an overload condition, and signaling discontinuance of the sampling of packets for the given data flow until one or more second control messages to resume sampling of the received packets are received, the second control messages to indicate the control plane has left the overload condition;
receive one or more second control messages; and
resume sampling of the received packets for the given data flow at a second sampling rate less than the first sampling rate applied before sampling was discontinued;
wherein the data flows are identified by a combination comprising a source Internet Protocol address and a destination Internet Protocol address.

28. An apparatus comprising
a memory;
one or more processors;
one or more network interfaces; and
a control plane application, stored in the memory, comprising instructions for causing the one or more processors to:
receive one or more sampled packets of respective data flows through a plurality of ports from a network processing unit;
classify the respective data flows based on the sampled packets;
identify one or more policies for the respective data flows;
transmit one or more first control messages including the identified policies for the respective data flows to the network processing unit, the first control messages indicating an overload condition; and
transmit one or more second control messages to the network processing unit, wherein the one or more second control messages signal to the network processing unit that samples the packets for the data flow identified in the one or more second control messages should be resumed, the second control messages to indicate that the control plane application has left the overload condition;
wherein:
the one or more first control messages each identify a data flow of the respective data flows sampled by the network processing unit and signal to the network processing unit that sampling of the packets for the data flow identified in the one or more first control messages should be discontinued; and
the data flows are identified by a combination comprising a source Internet Protocol address and a destination Internet Protocol address;
a non-transitory computer readable media;
a firmware application including instructions in the non-transitory computer readable media, the instructions, when executed, cause the processor to:
apply one or more policies to received packets of respective data flows according to a data plane configuration;
sample the received packets of the respective data flows to the control plane at a first sampling rate;
discontinue sampling of the received packets for a given data flow in response to receiving the one or more first control messages identifying the given data flow and indicating the overload condition; and
resume sampling of the received packets for the given data flow at a second sampling rate less than the first sampling rate applied before sampling was discontinued.

29. A non-transitory computer readable medium comprising
an application comprising instructions for causing a control plane processor to:
receive one or more sampled packets of respective data flows through a plurality of ports from a network processing unit;
classify the respective data flows based on the sampled packets;
identify one or more policies for the respective data flows; and
transmit one or more first control messages including the identified policies for the respective data flows to the network processing unit, wherein at least some of the one or more first control messages each identify a data flow of the respective data flows sampled by the network processing unit and signal to the network processing unit that sampling of the packets for the data flow identified in the one or more first control messages should be discontinued;
transmit one or more second control messages, wherein at least some of the one or more second control messages signal to the network processing unit that sampling of the packets for the data flow identified in the one or more second control messages should be resumed, the second control messages to indicate the control plane processor has left the clearing of an overload condition; and
a firmware application comprising instructions for causing a network processing unit to
apply one or more policies to received packets of respective data flows according to a data plane configuration;
sample the received packets of the respective data flows to a control plane at a first sampling rate;
discontinue sampling of the received packets for a given data flow in response to receiving from the control plane one of the first control messages identifying the given data flow, indicating the overload condition, and signaling discontinuance of the sampling of packets for the given data flow until one more second control packets are received;

receive the one or more first control messages from the control plane and update the data plane configuration according to information contained in the one or more first control messages; and resume sampling of the received packets in response to receiving the one or more second control messages from the control plane at a second sampling rate less than the first sampling rate applied before sampling was discontinued;

wherein the data flows are identified by combination of a combination comprising a source Internet Protocol address and a destination Internet Protocol address.

* * * * *